United States Patent
Hall et al.

[15] 3,699,581
[45] Oct. 17, 1972

[54] LARGE AREA DEPLOYABLE SPACECRAFT ANTENNA

[72] Inventors: Charles H. Hall, Redondo Beach; Albert L. Young, Cypress; N. Keith Young, Torrance, all of Calif.

[73] Assignee: TRW Inc., Redondo Beach, Calif.

[22] Filed: June 25, 1970

[21] Appl. No.: 49,611

[52] U.S. Cl................343/705, 343/DIG. 2, 343/915
[51] Int. Cl..................................................H01q 1/28
[58] Field of Search......343/705, 708, 880, 881, 915, 343/DIG. 2

[56] References Cited

UNITED STATES PATENTS

| | | | |
|---|---|---|---|
| 3,409,892 | 11/1968 | Mooney | 343/915 |
| 3,503,072 | 3/1970 | Thompson | 343/915 |
| 3,576,566 | 4/1971 | Cover et al. | 343/705 |

FOREIGN PATENTS OR APPLICATIONS

| | | | |
|---|---|---|---|
| 216,556 | 12/1941 | Switzerland | 343/915 |

*Primary Examiner*—Eli Lieberman
*Attorney*—Daniel T. Anderson, Donald R. Nyhagen and Jerry A. Dinardo

[57] ABSTRACT

A large area deployable antenna for a spacecraft to be enclosed in a cylindrical shroud during launch. The antenna includes a reflector having a number of panels hinged edge-to-edge on hinge axes parallel to the central axis of the spacecraft body and mounting antenna elements, such as collapsible phased array elements and means for mounting at least one of the central reflector panels on the spacecraft body and for folding of the remaining panels into a stowed configuration, wherein the several panels are symmetrically arranged about the body within an envelope slightly smaller than the interior of the spacecraft shroud, and a deployed configuration, wherein the panels are located substantially in a common plane to form an antenna array which is symmetrical relative to a plane normal to the deployed reflector and containing the spacecraft body axis. The panels are releasably secured in stowed configuration during launch and unfolded to deployed configuration by spring action in orbit.

11 Claims, 12 Drawing Figures

Charles H. Hall
Albert L. Young
N. Keith Young
INVENTORS

Charles H. Hall
Albert L. Young
N. Keith Young
INVENTORS

BY
ATTORNEY

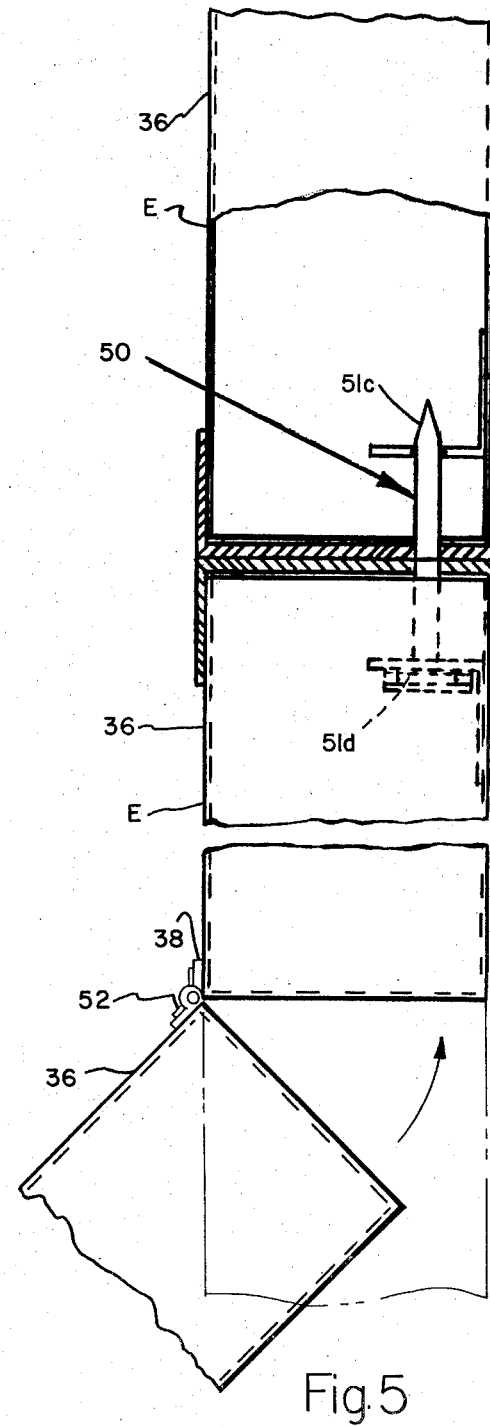
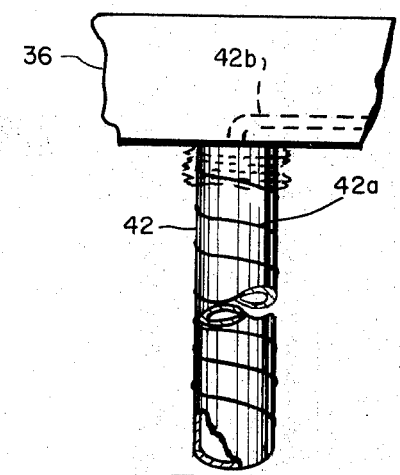
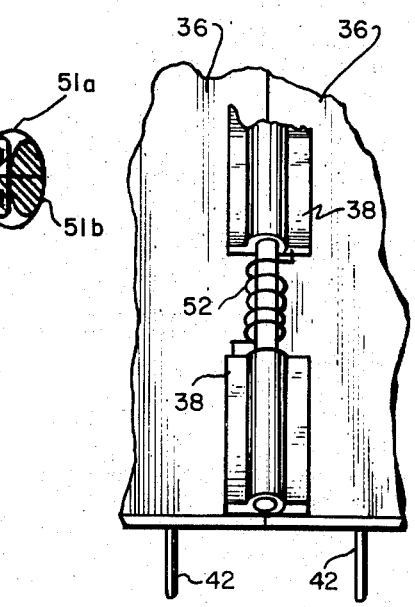
Fig. 6b
Fig. 6a
Fig. 5
Charles H. Hall
Albert L. Young
N. Keith Young
INVENTORS
BY
ATTORNEY Charles H. Hall
Albert L. Young
N. Keith Young
INVENTORS INVENTORS
Charles H. Hall
Albert L. Young
N. Keith Young

BY

ATTORNEY

Charles H. Hall
Albert L. Young
N. Keith Young
INVENTORS

LARGE AREA DEPLOYABLE SPACECRAFT ANTENNA

BACKGROUND OF THE INVENTION

1. Field of the Invention

This invention relates generally to antennas and more particularly to a large area deployable antenna for spacecraft.

2. Prior Art

Spacecraft communication systems vary widely in design, purpose, and the types of antenna they employ. In many cases, the design of the communication antenna constitutes a major portion of the overall system design effort. This is true, for example, of the antenna for a synchronous communications satellite which is required to communicate simultaneously with two low-orbit space vehicles.

From the operational standpoint the preferred communication system for such a satellite is a phased array system. As is well-known to those versed in the art, such a phased array communication system employs a phased array antenna including a large area reflector mounting an array of antenna elements, and a means for electronically actuating the elements in such a way as to steer the antenna radiation beam through a relatively large angle without any physical motion of the antenna structure. In the synchronous communication satellite system referred to above, for example, the satellite mounts a phased array antenna whose antenna elements are electronically actuated in such a way as to communicate with one low orbit space vehicle during one half of the cycle and with the other space vehicle during the other half of the cycle.

There have been a number of investigations directed toward the application of phased arrays to satellite communication systems. However, these investigations have paid little attention to the configuration analysis of the phased arrays in relation to the satellite. Also, designing a phased array of low structural weight, which can be stowed for launch and reliably deployed in orbit, presents a complex design problem which is not satisfactorily solved by the phased array configurations proposed thus far. Particularly, it is a major task to unfurl or deploy a large antenna array while at the same time holding the tolerances within the limits required for a phased array communication system.

SUMMARY OF THE INVENTION

The present invention provides an improved large area deployable spacecraft antenna which is primarily designed for the use discussed above, i.e., as a phased array antenna for a synchronous communication satellite capable of communicating simultaneously with two low orbit space vehicles. The antenna has a large area reflector comprising a group of panels hinged edge-to-edge on hinge axes parallel to the longitudinal axis of the spacecraft body. These reflector panels have outer sides mounting antenna elements. At least one central panel of the reflector is attached to the spacecraft body in a manner such that the reflector panels are foldable between stowed and deployed configurations. In stowed configuration, the panels are generally symmetrically arranged about the spacecraft body within an envelope smaller than the interior of the shroud which encloses the spacecraft during launch, thus to permit containment within the shroud of the entire spacecraft structure including the spacecraft body and its stowed antenna. In their deployed configuration, the reflector panels are located in a common plane generally parallel to the spacecraft body axis with the outer sides of the panels facing away from the spacecraft to form a spacecraft antenna.

In the particular inventive embodiment selected for discussion in the present disclosure, the antenna elements on the outer side of the reflector panels are phased array elements, such that the deployed antenna provides a phased array antenna. These antenna elements are collapsible elements, such as compressible or deployable helices, which collapse when the antenna is folded to its stowed configuration and extended to operating position when the antenna is deployed.

The present deployable antenna is equipped with locking means for releasably securing the reflector panels in their stowed configuration and with deployment means for unfolding or unfurling the panels to their deployed configuration upon release of the locking means. The disclosed locking means are explosive fasteners, and the deployment means are springs which act between the adjacent reflector panels to rotate the latter to their deployed configuration when the explosive fasteners are detonated to release the panels for deployment. Dampers may be provided for cushioning the panels upon arrival in their deployed positions.

BRIEF DESCRIPTION OF THE DRAWINGS

In the drawings:

FIG. 5 is a partial section of the area enclosed by the circular arrow 5 in FIG. 4;

FIG. 6a is an enlargement of the area enclosed by the arrow 6a in FIG. 6;

FIG. 6b is an enlarged detail of one antenna element;

DESCRIPTION OF THE PREFERRED EMBODIMENTS

Figure 1:
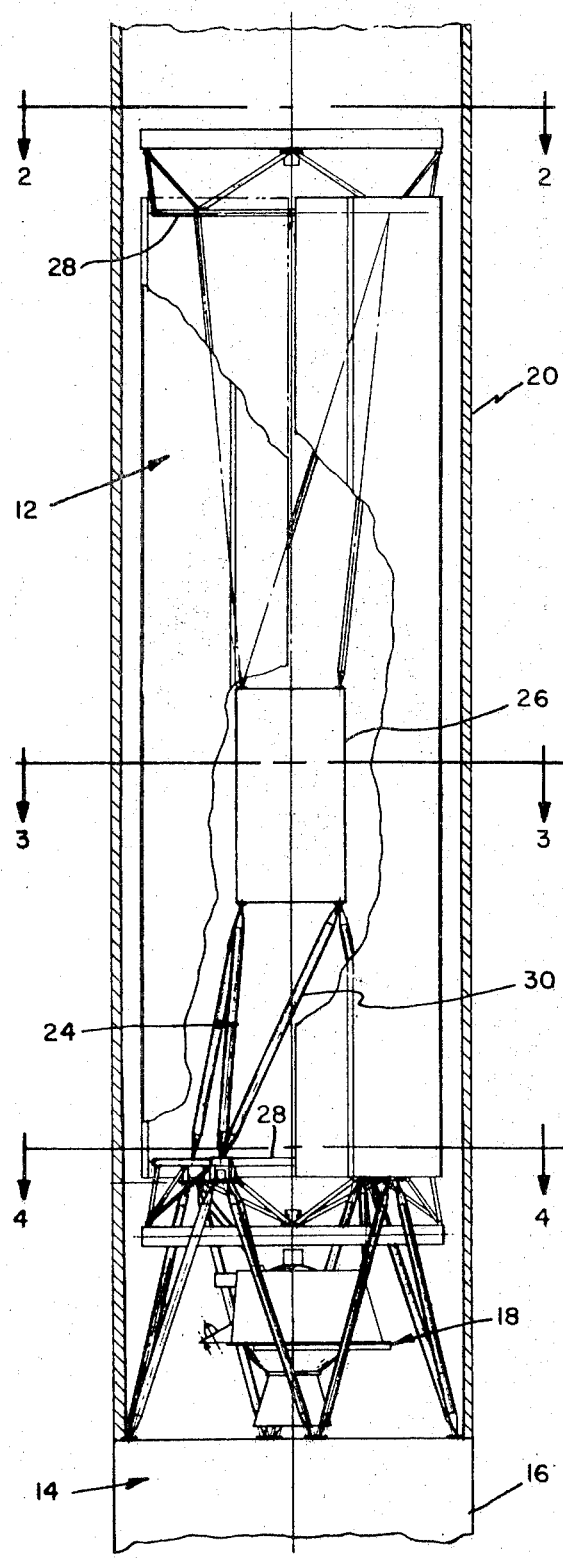
FIG. 1 is a side elevation of a spacecraft installed within the shroud of a launch vehicle and mounting a deployable antenna structure according to the invention, the antenna being shown in its stowed configuration.
Figure 2:
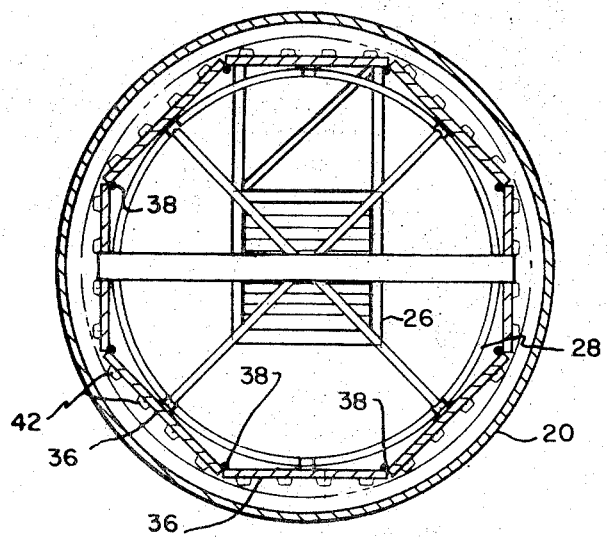
FIG. 2 is an enlarged section taken on line 2—2 in FIG. 1.
Figure 3:
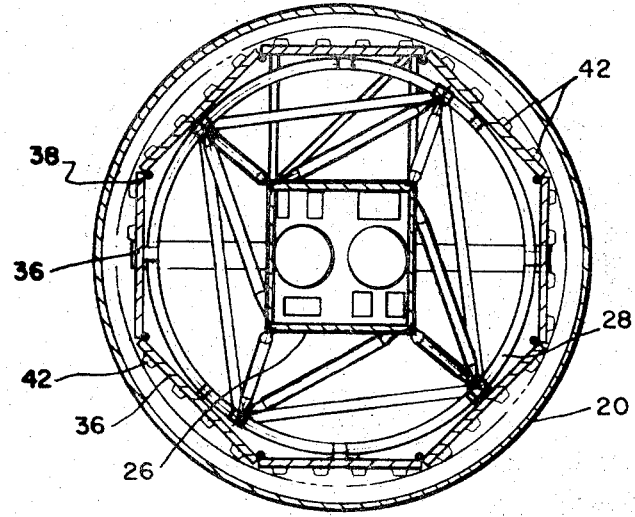
FIG. 3 is an enlarged section taken on line 3—3 in FIG. 1.
Figure 4:
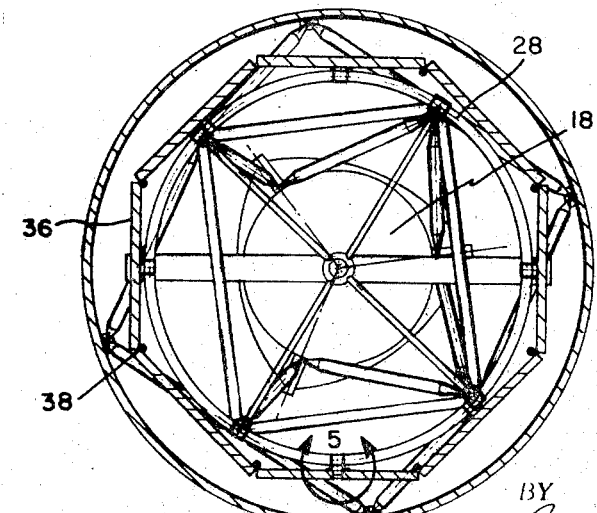
FIG. 4 is an enlarged section taken on line 4—4 in FIG. 1.

FIGS. 1 through 7 illustrate a spacecraft 10 including a large area deployable antenna 12 according to the invention. In FIG. 1, the spacecraft is shown mated to a launch vehicle 14 for launching the spacecraft into orbit. This launch vehicle includes a lower booster 16, an interstage burner 18, and a cylindrical shroud 20 which surrounds the spacecraft during launch. After launch the shroud 20 is jettisoned and the interstage burner 18 is fired to separate the spacecraft from the booster and place the spacecraft in final orbit. The burner is then separated from the spacecraft.

The illustrated spacecraft 10, which is a synchronous communication satellite of the kind referred to earlier, has a body including an open tubular frame 24 of hourglass configuration. This frame mounts a central equipment compartment 26. Frame 24 includes a pair of relatively large diameter coaxial end rings 28 joined to the equipment compartment 26 by tubular frame members 30. At the frame ends are deployable solar arrays 32 shown in FIG. 6. These solar arrays form no part of the present invention and hence need no further explanation.

Figure 6:
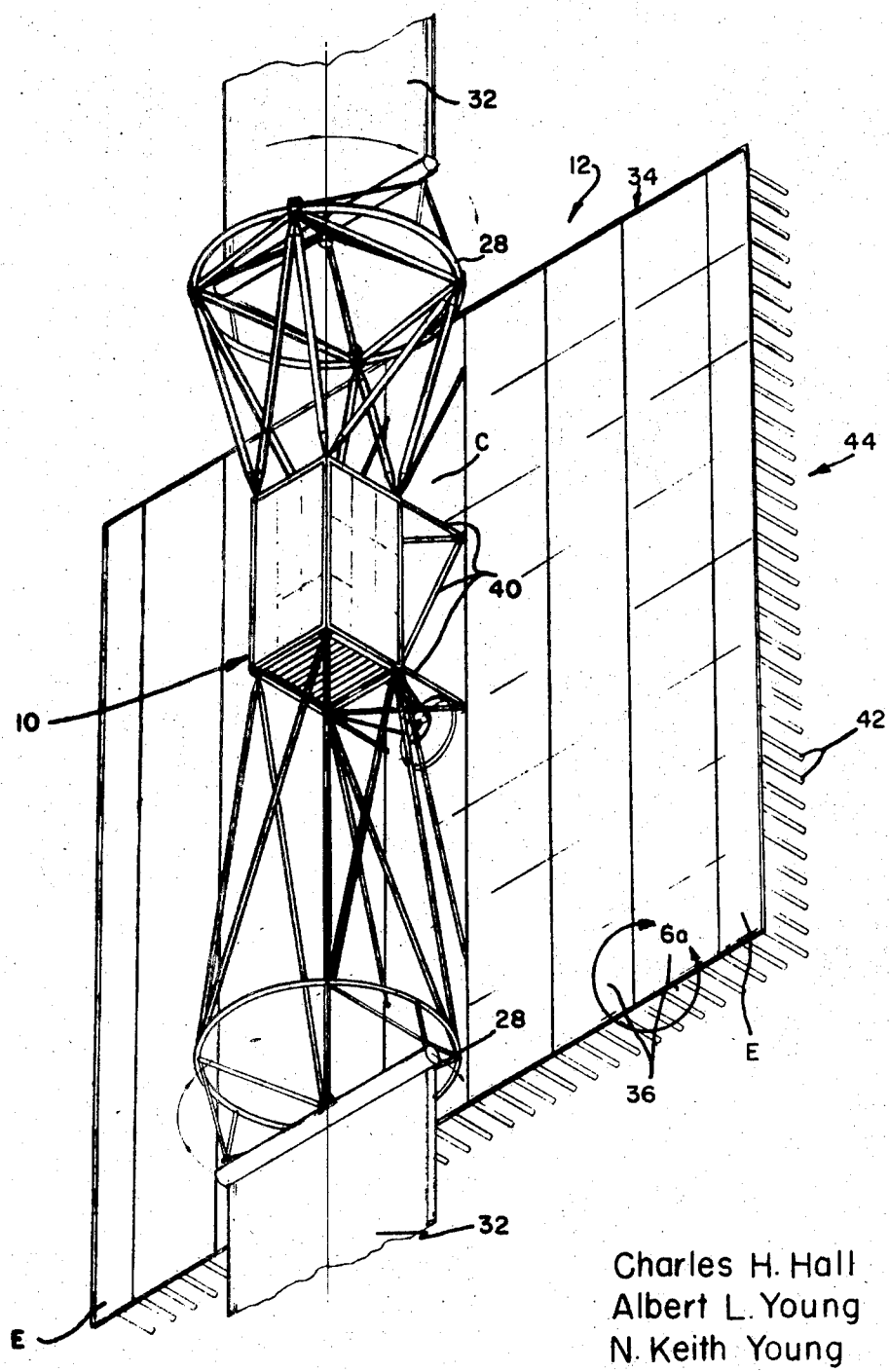
FIG. 6 illustrates the spacecraft in orbit with the antenna structure deployed.

The illustrated deployable antenna 12 is a phased array antenna including a rectangular radiation reflector 34 shown in FIG. 6 comprising a group of panels 36. These reflectors are joined edge-to-edge by hinge connections 38 having hinged axes parallel to the central axis of the spacecraft 10. In the particular inventive embodiment illustrated, the antenna reflector 34 contains an odd number of panels 36 and hence one central panel. The central panel is designated by the reference character C. The center reflector panel C is rigidly attached to the spacecraft frame 24 by struts 40 in such a way that the panel is generally tangentially disposed relative to the frame end rings 28. Mounted on the outer sides of the reflector panel 36 are collapsible antenna elements 42 arranged in the manner of a phased array.

Figure 7:
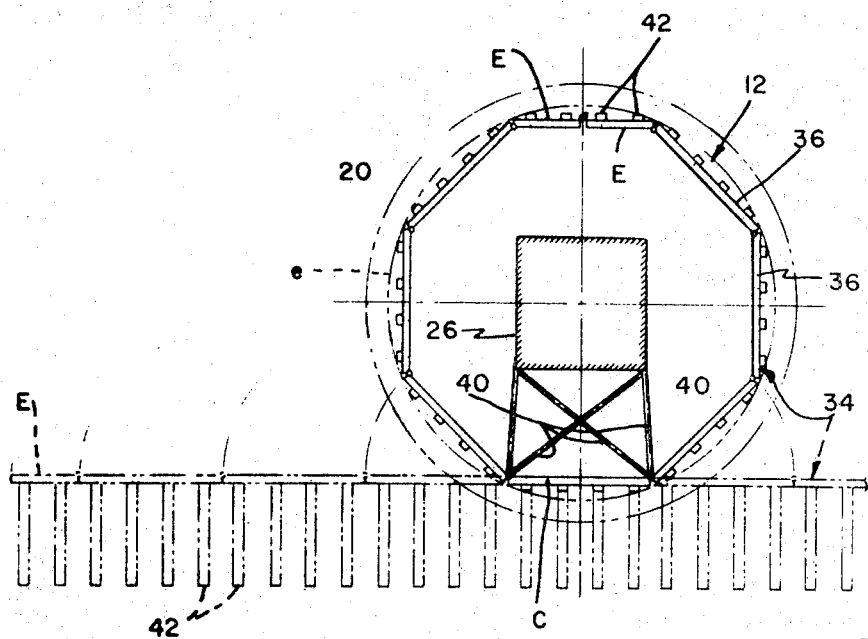
FIG. 7 is a section through the spacecraft illustrating the antenna structure in its stowed and deployed configurations with parts of the spacecraft omitted for the sake of clarity.

Reflector panels 36 are foldable at the hinges 38 between their stowed or launch configuration in FIG. 1 and their deployed configuration of FIGS. 6 and 7. In their stowed configuration, the reflector panels are generally symmetrically arranged in a polygonal configuration about the spacecraft 10. In their deployed configuration, the panels are arranged in a common plane to form a phased array antenna 44. The common plane of the reflector panels 46 in their deployed configuration may be either a flat plane or a curved plane, depending upon the desired radiation pattern of the antenna.

As shown in the drawings, the fully deployed reflector 34 is symmetrical about a plane $P_s$ normal to the reflector and containing the central axis of the spacecraft 10. This plane of symmetry intersects the center panel C of the reflector along its longitudinal center line and bisects the reflector 34.

In its stowed configuration, the illustrated radiation reflector 34 conforms to a polygonal configuration having an even number of sides, specifically eight sides. Accordingly, the several sides of the polygonal configuration, which are provided by the reflector panels 36, are arranged in pairs of parallel diametrically opposed sides. In order to achieve both the above-mentioned symmetrical disposition of the fully deployed reflector relative to the normal plane $P_s$ of symmetry and the even sided polygonal configuration of the stowed reflector, all of the reflector panels 36 of FIG. 7, except the two outer end panels E, have a uniform width, and these two end panels have a width half of that of the uniform width panels. When the reflector 36 occupies its polygonal stowed configuration, these two end panels are located diametrically opposite and in a common plane parallel to the fixed center panel C, so as to form one side of the polygonal stowed configuration. The outer longitudinal edges of these end panels are disposed adjacent one another approximately in the plane $P_s$ of symmetry of the fully deployed reflector 36.

The lateral width of the reflector panels 36 and the projection of the collapsed antenna elements 42 beyond the panels are dictated by the internal diameter of the launch vehicle shroud 20 which surrounds the spacecraft 10 during launch. Thus, the panels and the collapsed antenna elements are so dimensioned that the antenna 12, in stowed configuration, is contained within a cylindrical envelope $e$ smaller than the interior of the shroud. The illustrated antenna elements comprise inflatable plastic tubes (FIG. 6b). Secured to the wall of each antenna tube is a helically wound wire 42a which constitutes the actual antenna radiating and receiving element. The antenna tubes are deflated and collapsed to their broken line positions during launch and are extended to their solid line operating positions in orbit through pressuring lines 42b from a gas pressure source (not shown) in each panel activated by ground command signals.

Antenna 12 is equipped with locking means 46 for releasably locking the antenna panels 36 in their folded position and deployment means 48 for unfolding the panels to their deployed positions upon release of the locking. The illustrated locking means 46 comprises a clip 51a which joins the outer edges of the adjacent end panels E in their deployed position. Under this clip is a mild detonating fuse 51b which is ignited by a ground command signal to separate the clip from the end panels and thereby release the antenna for deployment under the action of deployment means 48. The stowed end panels are retained in alignment by pins 51c (only one shown) each having a fuse 51d which is ignited with the fastener fuse 51b to retract the pin. Deployment means 48 comprise torsion springs 52 embodied in the hinge connections 38 and active between the adjacent reflector panels 36. These springs are stressed when the panels are folded to their stowed configuration and bias the panels to their deployed configuration upon release of the locking means 50. As shown in FIG. 5 the edges of the adjacent panels abut in their fully deployed positions limit unfolding of the panels to these positions. If desired, damper cylinder (not shown) may be provided for controlling the deployment rate of the antenna in order to prevent impact of the adjacent panels at full deployment.

Figure 10:
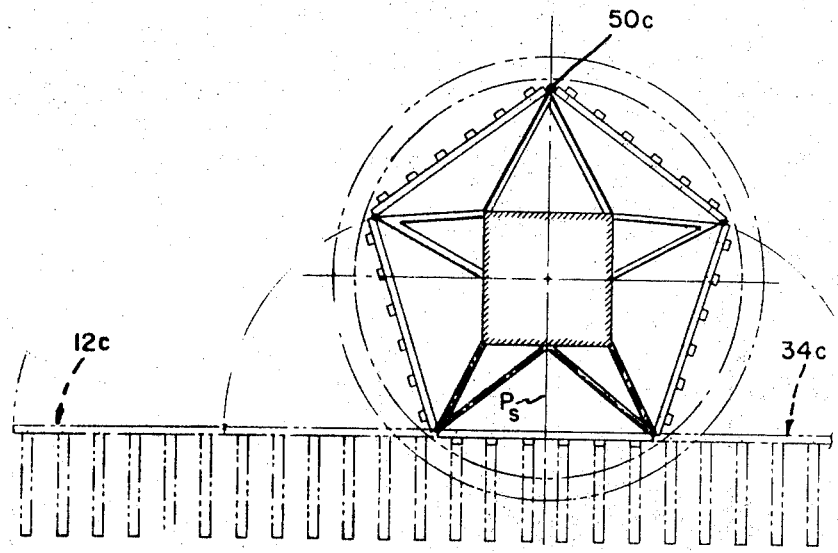
FIGS. 8 through 10 illustrate modified deployable antenna structures according to the invention.
Figure 8:
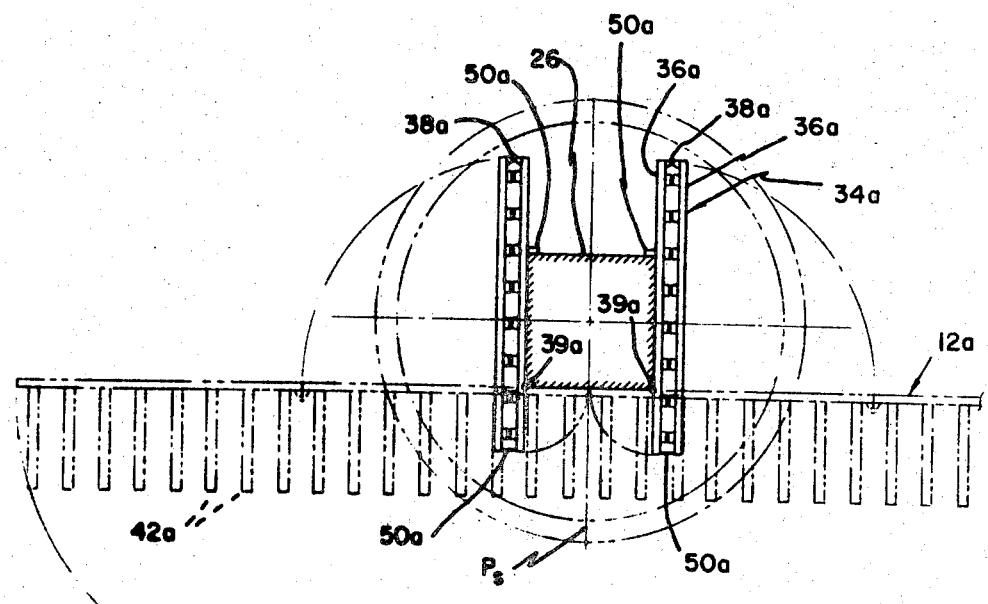
Figure 9:
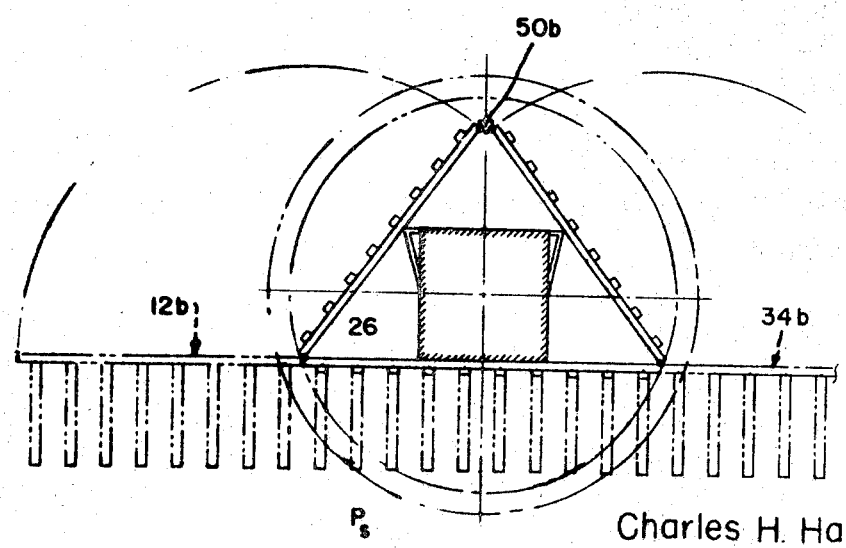

FIGS. 8 through 10 illustrate various alternative deployable antenna arrangements according to the invention. In FIG. 8, the antenna reflector 34a has an even number, i.e., four of panels 36a arranged in pairs at opposite sides of the spacecraft equipment compartment 26. The two panels of each pair are joined edge-to-edge by the hinge connection 38a. One panel of each pair is joined to the equipment compartment 36 by hinge connection 39a adjacent and parallel to the outer edge of the panel in a manner such that the panels are foldable between their solid line stowed configuration and broken line deployed configuration of FIG. 8. In their stowed configuration, the reflector panels are folded into parallel face-to-face relation against opposite sides of the equipment compartment 26. In deployed configuration, the reflector panels are disposed in a common plane to form a phased array antenna 12a essentially identical to antenna 44, except for the number of panels. In this regard, it is significant to note that the hinge connection 39a between the equipment compartment 26 and the adjacent inner reflector panels 36a are spaced from the adjacent panel edges distances equal to those between the latter hinge connection and the plane $P_s$ of symmetry of the deployed antenna. During deployment, the edges of the inner panels rotate to positions adjacent one another substantially within the plane of symmetry, as shown.

The modified antenna structure 12a, like the earlier described antenna structure, uses explosive locking means 50 to secure the reflector panels in their stowed configuration and torsion springs in the hinges 38a to deploy the panels when the panels are released by detonation of the locking means.

As shown, the antenna elements 42a are mounted on the sides of the reflector panels 36a which face one another in the stowed positions of the panels. These antenna elements are collapsible elements, like those of the antenna 12, such that the elements may be collapsed when the antenna is folded and extended when the antenna is deployed.

FIGS. 9 and 10 illustrate deployable antennas 12b, 12c according to the invention having radiation reflectors 34b, 34c with three and five panels, respectively. In each case, the center panel is rigidly mounted on the spacecraft body frame. The adjacent panels of each reflector are joined edge-to-edge by hinge connections for folding between their illustrated solid line stowed configuration and their broken line deployed configuration. The stowed configuration of each antenna is a polygonal configuration, that of FIG. 9 being a triangular configuration and that of FIG. 10 being a pentagonal configuration. In both illustrated embodiments, the outer edges of the end reflector panels are disposed adjacent one another approximately in the plane $P_s$ of symmetry of the antenna in its deployed configuration. These panel edges are joined by explosive locking means 50b, 50c which releasably retain the reflector panels in their stowed configuration. The adjacent panels are connected by springs which unfold the panels to their deployed configuration when the explosive locking means are detonated, all in the same manner as described earlier in connection with FIGS. 1 through 7.

It will be understood that in each of the embodiments of FIGS. 8 through 10, the spacecraft body is shaped to accommodate the antenna in its folded configuration and unfolding of the antenna to its deployed configuration.

What is claimed as new in support of letters patent is:

1. A spacecraft to be launched into orbit on a launch vehicle including an outer shroud for surrounding said spacecraft during launch comprising:
a spacecraft body; and
a large area deployable panel structure on said body comprising a number of panels disposed edge-to-edge with their adjacent edges parallel to the longitudinal axis of said body, and including a central panel, hinge means joining the adjacent panels along their adjacent edges, means rigidly mounting said central panel on said body for folding of the remaining panels between a stowed configuration, wherein said panels are generally symmetrically arranged in a polygonal configuration about said body within an envelope smaller than the interior of said shroud and a deployed configuration, wherein said panels are disposed substantially within a common plane, releasable locking means for releasably securing said panels in their stowed configuration, and deployment means for unfolding said panels to their deployed configuration upon release of said locking means.

2. A spacecraft according to claim 1 wherein:
said panel structure in its deployed configuration is approximately bisected by a plane containing the spacecraft body axis and intersecting said structure at right angles whereby the deployed reflector is generally symmetrically disposed relative to said latter plane.

3. A spacecraft according to claim 1 wherein:
said deployment means comprise springs acting between the adjacent mutually hinged panels.

4. A spacecraft according to claim 2 wherein:
said polygonal stowed configuration has an odd number of sides, such that the two end panels of said panel structure when stowed are disposed at an oblique angle with their outer edges located substantially in said plane of symmetry so as to define one apex of said polygonal stowed configuration, and said locking means releasably joins said end panel edges.

5. A spacecraft according to claim 2 wherein:
said polygonal stowed configuration has an even number of sides, and the two end panels of said panel structure have a lateral width equal to one-half the lateral width of the remaining panels, such that in said stowed configuration said end panels are disposed in the common plane parallel to said center panel with the outer edges of said end panels located substantially in said plane of symmetry to define one side of said polygonal configuration; and
said locking means releasably joins said end panel edges.

6. A spacecraft to be launched into orbit on a launch vehicle including an outer shroud for surrounding said spacecraft during launch comprising:
a spacecraft body;
a large area deployable panel structure on said body comprising four panels including two center panels and two outer panels, each center panel and its adjacent outer panel constituting a panel pair, a hinge connection joining the two panels of each pair in edge-to-edge relation on a hinge axis extending parallel the spacecraft body axis means mounting said panels on said body for folding of said panels between a stowed configuration, wherein said panels are generally symmetrically arranged relative to said body within an envelope smaller than the interior of said shroud and a deployed configuration, wherein said panels are disposed substantially within a common plane, releasable locking means for releasably securing said panels in their stowed configuration, and deployment means for unfolding said panels to their deployed configuration upon release of said locking means; and said mounting means comprising hinge connections joining said two center panels to said spacecraft body for rotation on hinge axes parallel to said spacecraft body axis and spaced from the outer edges of said two center panels in a manner such that in said deployed configuration, said outer edges of said center panels are disposed adjacent one another, and in said stowed configuration, the panels of said panel pairs are disposed in confronting face-to-face relation at opposite sides of said spacecraft body.

7. A spacecraft to be launched into orbit on a space vehicle including an outer shroud for surrounding said spacecraft during launch, comprising:
 a spacecraft body; and
 a deployable phased array antenna structure on said body comprising a radiation reflector including a number of panels, hinged connections joining said panels edge-to-edge on hinge axes parallel to the longitudinal axis of said spacecraft body, means mounting said panels on said body for folding of said panels between a stowed configuration, wherein said panels are generally symmetrically arranged relative to said body within an envelope smaller than the interior of said shroud, and a deployed configuration, wherein said panels are disposed substantially in a common plane and said reflector is approximately bisected by a plane containing said spacecraft body axis and intersecting the deployed reflector at right angles, whereby said reflector is generally symmetrically disposed relative to said latter plane, explosive locking means for releasably securing said panels in their stowed configuration, and springs acting between the adjacent mutually hinged panels for unfolding said panels to their deployed configuration upon release of said locking means.

8. A deployable antenna structure for a spacecraft to be launched into orbit on a launch vehicle having an outer shroud for surrounding said spacecraft during launch, said antenna structure comprising:
 a radiation reflector comprising a number of panels including a center panel and end panels, and hinged connections joining said panels edge-to-edge on parallel hinge axes;
 said panels being foldable between a polygonal stowed configuration wherein said panels define the sides of a polygon and the outer edges of said end panels are disposed approximately in a plane normal to and bisecting said center panel and containing the axis of said polygon, and a deployed configuration, wherein said panels are disposed substantially in a common plane;
 antenna means mounted on the outer sides of said panels;
 means for rigidly mounting said center panel on the body of said spacecraft;
 releasable locking means for releasably joining said end panel edges in the stowed configuration of said panels; and
 deployment means for unfolding said panels to their deployed configuration upon release of said locking means.

9. An antenna structure according to claim 8 wherein:
 said antenna means comprise phased array antenna elements;
 said locking means comprise explosive locking means; and
 said deployment means comprise springs acting between the adjacent reflector panels.

10. An antenna structure according to claim 8 wherein:
 said polygon has an odd number of sides; and
 said end panels are disposed at an oblique angle to one another directly opposite said center panels in said stowed configuration of said panels to form one apex of said polygon.

11. An antenna according to claim 8 wherein:
 said polygon has an even number of sides;
 each end panel has one-half the lateral width of the remaining panels and said end panels are disposed directly opposite said center panel in a common plane parallel to said center panel in said stowed configuration of said panels so as to form one side of said polygon.

* * * * *